United States Patent [19]
Bereznicki

[11] 3,939,889
[45] Feb. 24, 1976

[54] THREADED ASSEMBLY

[75] Inventor: Bogdan Bereznicki, Detroit, Mich.

[73] Assignee: Ford Motor Company, Dearborn, Mich.

[22] Filed: May 8, 1974

[21] Appl. No.: 467,984

[52] U.S. Cl.................................. 151/8; 151/23
[51] Int. Cl.².............................. F16B 39/04
[58] Field of Search................ 151/8, 23, 7

[56] References Cited
UNITED STATES PATENTS

| | | | |
|---|---|---|---|
| 573,044 | 12/1896 | Seely | 151/23 |
| 1,164,494 | 12/1915 | Gardiner | 151/8 |
| 3,129,742 | 4/1964 | Foroni et al. | 151/7 |
| 3,319,688 | 5/1967 | Rosan et al. | 151/23 |
| 3,353,580 | 11/1967 | Benjamin | 151/7 |

FOREIGN PATENTS OR APPLICATIONS

| | | | |
|---|---|---|---|
| 2,032 | 1/1894 | United Kingdom | 151/8 |

*Primary Examiner*—William H. Schultz
*Assistant Examiner*—Thomas J. Holko
*Attorney, Agent, or Firm*—Clifford L. Sadler; Keith L. Zerschling

[57] ABSTRACT

The preferred embodiment of this invention includes a member having an external thread and a nut received thereon. The nut has an annular plastic insert. A locking wedge, received in a keyway or groove in the member, is in wedged engagement with the plastic insert whereby the nut is prevented from rotating and the wedge is prevented from accidental dislodgement.

1 Claim, 5 Drawing Figures

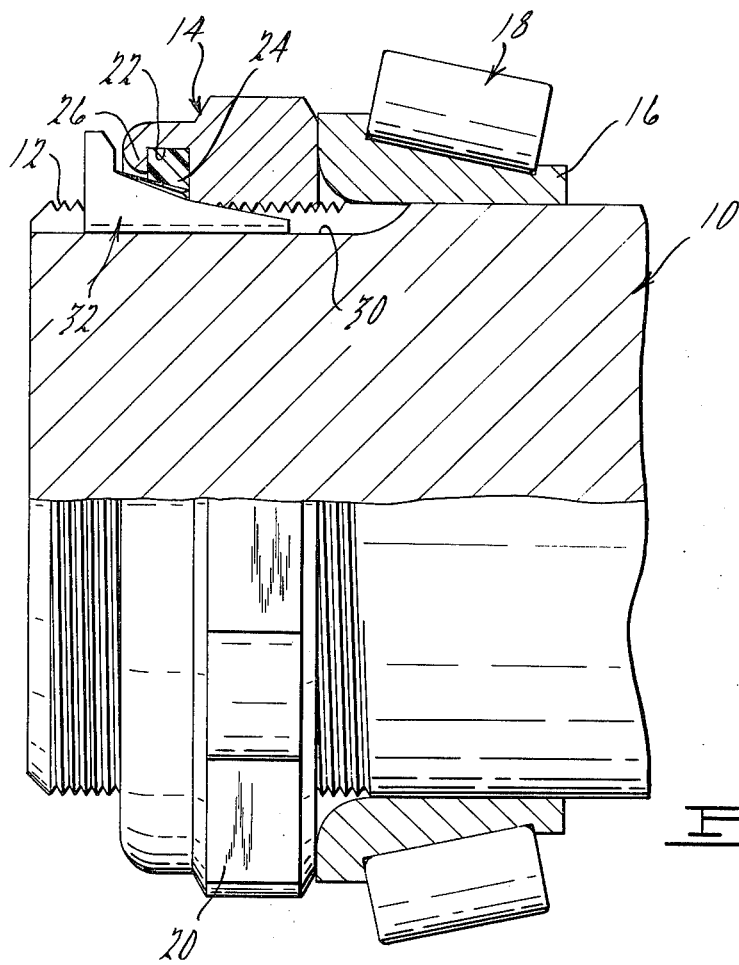
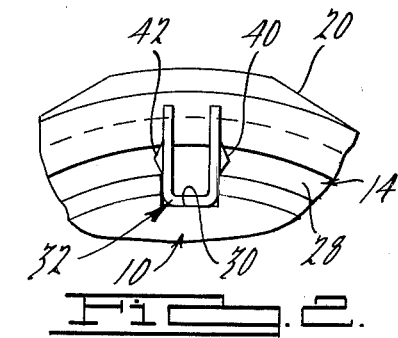
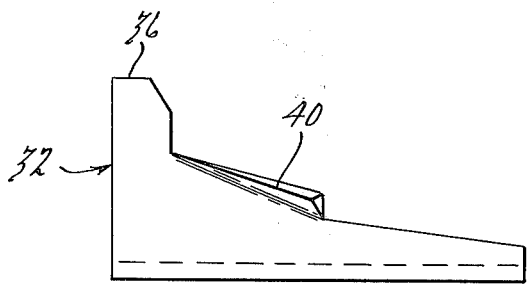
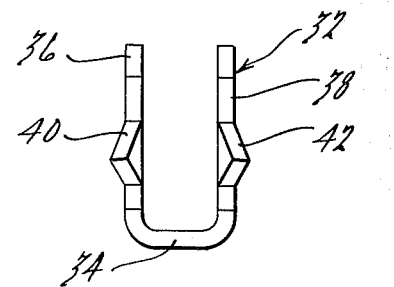
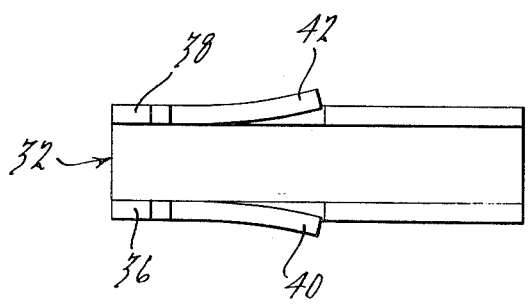

THREADED ASSEMBLY

BACKGROUND AND SUMMARY OF THE INVENTION

The present invention relates generally to threaded fasteners, and more particularly to a means for securing a nut on a threaded shaft.

It is well known in the fastener art to provide a plastic insert in a nut that engages the external threads of a bolt in order to make a self-locking nut. It is also known in the art to use keepers such as cotter pins to retain a nut on a threaded shaft. The present invention provides an improvement in the art whereby a nut may be threaded on a shaft and locked in position by a locking wedge whereby the nut is positively retained against accidental angular displacement.

In the presently preferred embodiment of the invention, the nut has an inwardly facing annular channel and an annular plastic insert is positioned in the channel. The nut is constructed to be threaded onto a shaft with the annular plastic insert in engagement with the external threads of the shaft. The shaft is provided with a groove or a keyway in which a wedge shape locking element or keeper is inserted. The locking element is forcibly inserted in the groove and has a pair of inclined surfaces that engage the plastic insert. The wedge prevents accidental rotation of the nut. The engagement between the plastic insert and the inclined surfaces prevent the wedge from being accidentally dislodged.

BRIEF DESCRIPTION OF THE DRAWINGS

The many objects and advantages of a threaded assembly constructed in accordance with this invention will become apparent upon consideration of the following detailed description and the accompanying drawings, in which:

FIG. 1 is a side elevational view, partly in section, of a threaded shaft, a nut and a locking wedge constructed in accordance with the invention;

FIG. 2 is an end view of the shaft, the nut and the locking wedge of FIG. 1;

FIG. 3 is a side elevational view of the locking wedge;

FIG. 4 is an end view of the wedge; and

FIG. 5 is a top plan view of the wedge.

DETAILED DESCRIPTION OF THE PREFERRED EMBODIMENT

The several figures of the drawing disclose the presently preferred embodiment of a locking system for a nut threadedly positioned on a shaft.

FIG. 1 shows a shaft 10 having an external threaded portion 12. A nut 14 has internal threads that engage the threaded portion 12 of the shaft 10. The nut 14 engages the inner race 16 of a roller bearing 18.

The nut 14 is carefully rotated to a specified torque loading in order to provide the bearing 18 with a precise amount of initial bearing load. The nut 14 is provided with a series of flats 20 along its exterior surface in a customary manner to form a tool receiving surface to permit the nut to be tightened against the bearing 18.

In accordance with the present invention, means are provided for retaining the nut 14 in a set position after the bearing 18 is loaded.

The nut 14 is provided with an inwardly opening annular channel 22 in which an annular plastic element 24 is situated. The element 24 may be formed of nylon or other similar rigid plastic. The inner diameter of the annular plastic piece 24 is slightly less than the maximum diameter of the threaded portion 12 whereby the plastic engages the thread and functions to a limited extent as a locking means for preventing accidental rotation of the nut 14. The channel 24 is defined, in part, by an inwardly extending flange 26. The inner diameter of the extremity of the flange 26 is greater than the inner diameter of the plastic 24 whereby a portion 28 (see FIG. 2) is exposed.

The shaft 10 is provided with a longitudinally extending keyway or groove 30 in the surface of the threaded portion 12. A locking wedge 32 is positioned in the groove 30 in locking engagement with the plastic element 24 to prevent accidental rotation of the nut 14.

As seen in FIG. 4, the locking element 32 has a generally U-shape with a base portion 34 and a pair of parallel side flanges 36 and 38. The upper edges 40 and 42 of the locking element 32 are inclined in the side elevational view and are bent or angled outwardly as shown in FIGS. 4 and 5 to form barb-like structures.

OPERATION

The locking element 32 is positioned in the groove 30 in the shaft 10 and driven longitudinally inwardly whereby the inclined portions 40 and 42 bite into the exposed portion 28 of the plastic element 24. The wedge 32 is driven inwardly with the inclined portions 40 and 42 passing through the plastic element 24 and into engagement with the wall of the annular channel 22 in the nut 14. The inclination of the portions 40 and 42 serve a barb-like function to prevent accidental withdrawal of the wedge 32. In addition, the width of the wedge 32 is dimensioned so that the wedge 32 has a snug fit in the groove 30.

The locking wedge 32 is effectively interposed between the nut 14 and the shaft 10 so as to prevent accidental rotation of the nut. The engagement of the inclined surfaces or edges 40 and 42 with the plastic 24 prevents the locking wedge 32 from being accidentally dislodged.

Thus, the present invention provides a locking device for a nut and shaft assembly that is characterized by its simple and economical construction. The locking device 32 effectively prevents accidental rotation of the nut 14 and is itself wedged against accidental dislodgement due to its engagement with the plastic 24. The exposed ends of the flange portions 36 and 38 provide a convenient means for gripping the wedge 32 with a pair of pliers for withdrawing the wedge in the event it is desired to remove the nut 14.

The foregoing description presents the presently preferred embodiment of this invention. Modifications and alterations may occur to those skilled in the art that will come within the scope and spirit of the following claims.

I claim:

1. A threaded device comprising a member having an externally threaded portion, a longitudinally extending groove formed in said portion, a nut having an internal thread positioned on said member, said nut having an inwardly opening annular channel and an annular organic plastic insert positioned in said channel engaging said externally threaded portion, an elongated locking element operatively interposed between said member and said nut, said locking element being positioned in said groove and constructed to prevent the angular displacement of said nut relative to said member, said locking element having a greater dimension in the radial direction than the depth of said groove whereby said locking element extends radially outwardly beyond the circumference of said externally threaded portion, said plastic insert engaging said locking element and constructed to prevent the longitudinal displacement of said locking element relative to said nut, said locking element having a generally channel shape defined by a base portion and a pair of parallel flange portions, said flange portions each having an inclined surface in wedged engagement with said plastic insert, said inclined surfaces causing the deformation of said plastic insert, at least one of the edges of said inclined surfaces being bent outwardly to enhance the retaining effect of said wedged engagement between said locking element and said plastic insert.

* * * * *